Nov. 11, 1952 G. C. IZENOUR Re. 23,575
LIGHTING CONTROL CIRCUITS
Original Filed Aug. 28, 1947
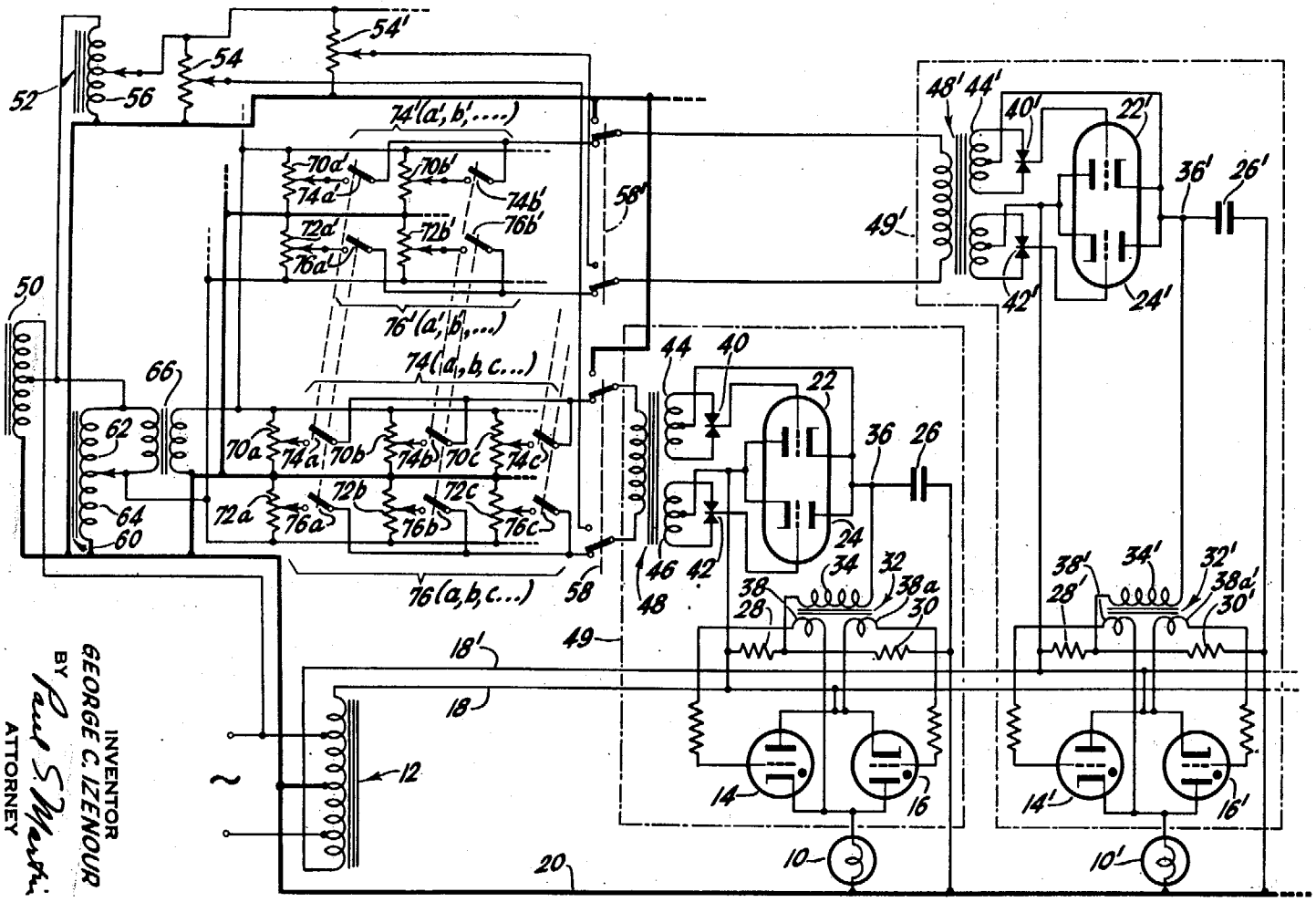
INVENTOR
GEORGE C. IZENOUR
BY Paul S. Martin
ATTORNEY Reissued Nov. 11, 1952 Re. 23,575

UNITED STATES PATENT OFFICE 23,575

LIGHTING CONTROL CIRCUITS

George C. Izenour, New Haven, Conn.

Original No. 2,463,463, dated March 1, 1949, Serial No. 770,999, August 28, 1947. Application for reissue February 25, 1950, Serial No. 146,380

58 Claims. (Cl. 315—197)

Matter enclosed in heavy brackets [ ] appears in the original patent but forms no part of this reissue specification; matter printed in italics indicates the additions made by reissue.

The present invention relates to electrical control circuits for lighting, as in theatres and in television studios.

The currently typical theatre lighting installation has resisted modernization for many years. It includes a large control panel located backstage and off-side, where the operator can view the performance only obliquely. There are large rheostats that are connected in series with various lamp banks through plug-boards and having individual circuit breakers. The rheostats are necessarily large to dissipate the power represented in the drop in applied voltage when the lamps are operated at less-than-peak intensity. Obvious wastes of space and power are entailed.

Appreciable manual effort is required to adjust each rheostat because of its large and firm sliding contacts; and ordinarily one man cannot adjust more than two rheostats simultaneously for different effects. A few rheostats can be coupled for joint mechanical control; but when so connected they are constrained to operation between like limits and cannot usually be operated simultaneously for fading several lamp banks proportionally between independent limits of intensity. The variety and subtlety of lighting changes are thus narrowly limited.

Each rheostat, being bulky, requires a definite, large allocation of space and panel area; so that spares to be reserved for service when others need repair cannot economically be provided, and alteration or expansion of the lighting control equipment is a major undertaking.

There have been a few attempts at remote control of stage lighting, in order to get the operator "out front" with the audience for a direct view of the performance. This has been accomplished in one instance through the use of rheostats operated by motors and electrically controlled clutches, but the initial cost and the space requirements are considerably increased. In addition an objectionable time lag is introduced between a change of control and its effect.

Another remote-controlled lighting control system centers about saturable reactors, where controlled direct current determines the saturation of the cores in the reactors; and these variably reduce the voltage supplied to the lamps efficiently, without significant power loss except for the direct current in the control circuits. However, a very significant power loss avoidance is accompanied by a very significant time lag introduced between the change of control and the change of effect, most pronounced with large loads that require large reactors. Furthermore, reactors are inflexible, in that they must be used with loads of definite sizes, within a limited range, to be effective; and they are massive.

With this background my invention will be better understood and appreciated; for several of its features are generally useful as separate improvements over other control systems when used therein, and the features combined as in the illustrative embodiment to be described contribute mutually toward a lighting control system improved in many respects over any comparable system now available. Among the objects of my invention are to provide novel lighting control equipment for producting more varied dramatic and artistic effects, so characteristically compact that increased control capacity can be installed in even a small and inaccessible control room; to provide a remote-controlled lighting system of such nature that the operator can manipulate many controls independently and can be stationed wherever is best for judging effects; to devise lighting control circuits of high efficiency in that power not actually consumed in the lamps will be conserved; to provide circuits and methods for effectively utilizing grid-controlled gas-type electron-discharge devices in lighting control circuits; to eliminate the mechanical and electrical time-lag inherent in known remote-controlled lighting systems; and to provide a lighting control system built up of interchangeable units, so that replacement and repair of a unit and expansion of the system become relatively simple operations.

A further aim is to provide a control system to enable even an unskilled operator to control many lighting banks in a sequence of scenes with predetermined intensity schedules, from one performance to others. Equipment of this nature is of particular value in television studios where lighting sequences should be established during rehearsal, and later unfailingly reproduced promptly and without experimentation during carefully timed broadcasts.

From the foregoing and from the following detailed description of a presently preferred but illustrative application of various features of my invention, it will at once be obvious that almost endless substitution of equivalents, detailed rearrangements and extensions of the novel features may be practiced by those skilled in the art without departing from the spirit of the invention. It should also be understood that certain of its features can advantageously be incorporated in lighting systems of different characteristics than that illustrated, without others of the novel features in the system illustrated.

The drawing is the wiring diagram of the presently preferred embodiment of the invention, showing only two lamps and their control circuits, but indicating the manner of extension to numerous separate, optionally correlated lamp and control circuits. Incandescent lamps 10 and 10′ are energized by opposite halves of step-up autotransformer 12 through back-to-back thyratrons 14, 16, 14′, 16′, respectively. Each of these lighting circuits is connected between a bright bus 18 or 18′ and a neutral bus or ground 20 (shown throughout the diagram as a darker line). The autotransformer divides the line voltage to provide a neutral with a roughly balanced load on each side. Autotransformer 12 boosts the resulting divisions of the line voltage to compensate for the internal voltage drop in the thyratrons and the autotransformer itself so that lamps of standard voltage ratings can be used. Thyratrons are chosen for moderate loads, and this term is intended to represent any appropriate grid-controlled gas-type electron-discharge devices generally. Each pair of thyratrons provides independent control for its series lamp, although it will appear that coordinating controls are also available. Each lamp 10 and 10′ is representative of a single lamp or a lighting bank that optionally includes many lamps, up to the current limit of the thyratrons.

Under proper conditions of grid excitation each thyratron can be made conductive during substantially an entire half of an alternating-current cycle. The pairs of thyratrons, because of their back-to-back connection, can supply lamp current throughout the alternating current cycle when maximum intensity is desired. By properly adjusting the grid excitation of the thyratrons the firing of each can be retarded, for lower light intensities. A change of this adjustment is instantly followed by a change in light intensity, for no heavy iron-cored inductor is included in the lamp circuit.

The thyratron grids are here supplied with alternating current, and their control effect is attained by controlling the phase of the grid drive in relation to the plate alternating current supply. Where the grid voltage is in phase with the plate supply or somewhat leading, the thyratron plates will be conductive during substantially complete half-cycles because the instantaneous grid voltage will be positive at the start of the positive half-cycles of the plate. By applying lagging voltage between the thyratron grids and cathodes, the firing of the thyratrons can be delayed during each half-cycle, since the grid voltage remains negative during the elapsing first part of each positive half-cycle of the plate. By controlling the phase of the grid voltage, the time-division during which current is supplied to the lamps can be varied to change the effective current, although the instantaneous current during the conductive intervals may not vary significantly. In this way the energy supplied to the lamps from fixed-voltage lines is efficiently varied, without the large power waste characteristic of the series resistors so commonly used in lighting control.

The grid-supply circuit of thyratrons 14 and 16 will be described in detail, that of thyratrons 14′ and 16′ being in most respects identical as will be understood from the primed numerals on like parts. The thyratron grid supply includes a pair of back-to-back vacuum-tube sections 22 and 24 connected in series with condenser 26 across the same buses 18 and 20 that supply the thyratron-lamp circuit. Sections 22 and 24 are enclosed in a common envelope for convenience only; they may readily be replaced by separate vacuum tubes, and will therefore be treated as separate tubes. Tubes 22 and 24 together pass alternating current and represent a resistance the magnitude of which depends on the grid drive. A pair of resistors 28 and 30 are also connected across buses 18 and 20, the junction of the resistors furnishing a voltage reference point. The primary winding 34 of thyratron grid transformer 32 is connected between the junction of these resistors and the junction 36 of the condenser 26 and vacuum tubes 22, 24. (A trimmer resistor is sometimes desirable between condenser 26 and junction 36; so that the latter does not necessarily exist as a tube-condenser junction.) Separate secondaries 38 and 38*a* are connected between the respective grids and cathodes of thyratrons 14 and 16, through the usual grid current limiting resistors.

In successive half-cycles the thyratron grids are alternately energized to fire their respective plate-circuits. When the plate of one thyratron is negative, its grid voltage is of no concern; for the voltage on the grid of the associated thyratron will control the time of firing of that thyratron during the positive half-cycle of its plate. In the subsequent half-cycle the plate polarities are reversed, and at the same time the grid control voltage is reversed, to establish the desired control relation in the previously idle thyratron. Condenser 26 and vacuum tubes 22, 24 provide full-wave drive of controlled phase to the thyratron grids.

The full-cycle control by the thyratrons over the lamp circuit reduces the required current rating of each and promotes superior lighting-control and line-loading conditions. This full-cycle control utilizes the full-cycle symmetry provided by the back-to-back vacuum-tube phase control network.

In firing, each thyratron suddenly imposes a load on the line. Many lighting loads may be assembled in any given scene, with certain of them operating at different intensities. Because of this, there may be disturbances in line voltage caused by early-firing thyratrons that have some unplanned effect on the control circuits of the later-to-be-fired thyratrons, tending to produce flickering. To minimize the effect of line-voltage transients caused by other lighting circuits and by miscellaneous loads, and partly for added flexibility of the control equipment, I have found that excellent stability of control can be realized through supplying full-wave rectified alternating current to the grids of vacuum tubes 22 and 24. The reason for improved flexibility will become clear as the disclosure continues.

The grids of vacuum tubes 22 and 24 are connected to the negative output terminals of selenium dry-disc full-wave rectifiers 40 and 42, energized by secondaries 44 and 46 of transformer 48, the center-taps of the secondaries being connected to the respective cathodes of vacuum tubes 22 and 24. By controlling the amplitude of voltage supplied to grid transformer 48, the plate resistance of tubes 22 and 24 can be varied widely, as by driving the tubes to cut-off for maximum resistance or by minimizing the supplied voltage, for minimum plate resistance. As the resistance changes from minimum to maximum the phase of the voltage at point 36 varies through almost 180 degrees. This provides economically and simply for adequate phase-control of the thyratrons, in achieving intensity control for the lighting banks. In review it is observed that the controlled magnitude of alternating-current voltage supplied is converted to variable controlled resistance, and then to phase-controlled voltage for the thyratron light-intensity regulators.

Thyratrons 14 and 16, transformers 32 and 48, vacuum tubes 22 and 24, condenser 26, and resistors 28 and 30 together comprise a control unit 49 that is adapted to convert low-power voltages supplied from a remote point into efficient and compact intensity control for lamp or lamp-bank 18. This unit is connected to the same bright bus as the lighting circuit controlled and to the neutral to which all lighting circuits and control units are connected. Unit 49 is interchangeable for unit 49' and for other control units. They occupy a minimum of space, are readily removed, repaired when necessary, and installed; and these features facilitate alteration and expansion of any given installation to meet changing lighting requirements. Only one phase of power for input transformers 46, 46', etc., is required whether the controlled lighting circuit is connected to bright bus 18 or to bright bus 18'. This flexibility, mentioned previously, is attributable to rectifiers 40 and 42 which not only smooth out the transients impressed on the vacuum-tube grids, but also eliminate phase-reversal difficulties.

Units 49, 49' and so on include the thyratrons which pass lighting currents that are heavy, and for this reason the units are located near the lighting center, assembled in a rack in any available space. The operator is stationed at any convenient point where the lighting effects can be viewed directly, remote from the bank of control units. Between the operator's position and the control bank there is a cable including a pair of low-current power lines and a large number of control lines to transformers 46, 46', etc.

Two adjustable networks are available to the operator. Both networks are energized by step-down autotransformer 50, connected between one input terminal of autotransformer 12 and neutral. Both networks are useful in a single installation for different purposes. The networks are similar in that they both include a master potentiometer and at least one group of potentiometers individual to each lighting bank over which separate control is or may be desired.

The simpler control network of the two is termed the Individual Proportional Master. A variable autotransformer 52, used as the master potentiometer, is connected at its input terminals to autotransformer 50 and has a series of individual potentiometers 54, 54', etc., connected at their input terminals to the adjustable output portion 56 of the master potentiometer. An individual potentiometer is provided for each lighting bank 18, 18', etc. The power required of each potentiometer 54 is very low, only enough to energize one very small transformer 48 and its rectifier and negative-grid load. Consequently the individual potentiometers can be miniature sliding-tap resistors so inexpensive and readily available. The output portion of each individual potentiometer is connected through a double-pole double-throw transfer switch 58, through the connecting cable, to its respective input transformer in unit 49, 49', etc. When the Individual Proportional Master is operated, through its master potentiometer 52, all of the light banks are varied between darkness and the several brightness limits as fixed by the several individual potentiometers. This variation is uniform and proportional; no light bank reaches its maximum intensity before the others. In the operator's booth the individual potentiometers are arranged for easy access, so that an individual light bank can be readily adjusted as circumstance may demand without affecting the others.

The other control network for units 49 is termed the Fader and is energized by the same autotransformer 50 that supplies the first control network It includes sliding-tap autotransformer 60 as its master potentiometer, having adjustable complemental portions 62 and 64. The latter portion is on the neutral side of the fixed-voltage supply line. The primary winding of unity-ratio transformer 66 is connected across output portion 62 of master 60, and one of its secondary terminals is grounded. A series of miniature sliding-tap resistors 70a, 70b, 70c, etc., termed preset potentiometers or simply presets, is connected across the secondary of transformer 66. A second series of presets 72a, 72b, 72c, etc. is connected across the grounded output portion 64 of master potentiometer 60. A selector-switch deck 74, having contacts 74a, 74b, 75c, etc., is arranged to connect any selected slide contact of presets 70 through transfer switch 58 to one input terminal of unit 49. Similarly, another selector-switch deck 76 having contacts 76a, 76b, 76c, etc., is arranged to connect any selected slide contact of presets 72 through transfer switch 58 to the other input terminal of unit 49. The output portions of presets 70 and 72 are thus connected in series to energize unit 49, and their junction is grounded. This symmetry of the presets about neutral or ground is a factor promoting safety and facilitating construction, and is the controlling reason for including the unity-ratio transformer.

The phasing of transformer 66 is such that its output is series-aiding with respect to the output of portion 64 of master potentiometer 60. The voltage across preset 70 and 72 in series thus remains constant at the terminal voltage of master 60 regardless of the position of its slide contact, the internal voltage drops in parts 60 and 66 being disregarded as negligible. By moving the slide of master 60 from one extreme to the other, the terminal voltage of the master can be shifted from the selected preset 70 to the selected preset 72 and reversely. One preset or the other remains in the circuit, to the extent of its output portion, without delivering voltage; but the input impedance of unit 49 is by design so high in relation to the total series resistance of any selected pair of presets (a factor of twenty-five is desirable) that the inclusion of part of the idle preset in the output circuit of the energized preset is of little consequence. The arrangement is of considerable advantage in fading from lighting control by one preset to control by the other preset of any selected pair 70 and 72. The brightness varies smoothly from the limit determined by the setting of one preset to that fixed by the other preset, with no objectionable dip into darkness. Of course, if darkness were actually required between different levels of intensity, this could be accomplished by setting a preset of one group at zero and shifting from one preset of the other group to the zero preset and then to a second preset of the first group.

During the times when one preset is effective, the idle one can be adjusted if desired, although this would not be usual. However, switches 74 and 76 are of such construction that at least one pair of their contacts is closed in all positions of adjustment; and with this provision the selector switch of the idle preset can be manipulated for a new selection, sequentially as from position a to b or otherwise, without affecting the lighting control circuit to transformer 48. When a new selection has been made, and the scene requiring the effective presets is over, master 60 is operated to render the new selection effective. The preset of any group 70 and 72 can be selected while the other group 72 or 70 respectively, is in effect; and the presets of that other group can be switched after fading to a preset in the previously idle group.

Additional groups of presets 70' and 72' (including presets 70a', 70b' . . . and 72a', 72b', . . . ) are connected to the same master 60 and transformer 66 as for presets 70 and 72, for controlling unit 49' of lamp bank 10'. Corresponding selector-switch decks 74' and 76' are also provided. Switch decks 74, 74', etc. (one for each lamp bank to be controlled) are mechanically ganged to constitute one selector switch, and switch decks 76, 76', etc. are similarly ganged to constitute a second selector switch. It is thereby made possible to fade from one complete array of preset lighting conditions to another, smoothly and proportionally, simply by manipulation of master potentiometer 60 from one extreme to the other. Selection of a new preset lighting array is achieved simply by operation of either selector switch 74, 74', . . . or selector switch 76, 76' . . . while the other remains in the circuits of the effective presets. For special effects or in case of emergency it is also possible to switch over to the Individual Proportional Master network by throwing any desired one or group of transfer switches 58. With the aid of a preset array in each selector switch set for darkness, it becomes possible to fade into dark from any given preset selection, transfer to the other network by throwing all transfer switches 58, and then operating its master 52 from zero to maximum. Convenient variation of intensity of any or several light banks, individually by means of potentiometers 54, 54', etc., is thus enabled. Return to Fader control is achieved smoothly by return to darkness using Master 52, reversal of switches 58 with "dark" presets in effect, and reverse sweep of master potentiometer 60 to lighting under selected preset conditions. In any given scene it may be required to dim one important lamp bank without affecting the other lighting, and this can be achieved either by fading to another group of presets having appropriate adjustments, or by shifting that lamp bank to the other network for individual variation.

Using the control system described, the lighting requirements of a sequence of dramatic incidents can be preset, and the operator can fade from one to the next smoothly and expeditiously, irrespective of the desired number of lamp banks of differing peak intensities. This control can be duplicated from one performance to the next. The flexibility of control achieved with the presets can be extended by transfer to the individual controls as described, restricting the transfer to only the desired banks. The nature of the control units and their control networks is such that the changes of intensity follow instantly with the operation of the controls, without the electrical and mechanical lags characteristic of known remote-controlled lighting systems. The control networks that may be located far from the heavy-current lighting circuits are simple, compact and inexpensive. The heavy-current control units 49 are interchangeable, they may be used for all sizes of lamp banks up to the maximum rating of the thyratrons, and the units are of such nature that expansion to meet new lighting requirements is comparatively an easy task. None of the ponderous components and unwieldy controls of previous lighting control systems are required. The system is highly efficient. For the most part it utilizes such small parts as are commonly found in radio receivers; and the thyratrons consume very little power in comparison to the lamps they control. As an indication of scale, Master 60 of one ampere rating can simultaneously supply about 200 presets and their control units.

The foregoing represents a preferred lighting control system illustrating several separately and collectively useful features of my invention, as pointed out in the appended claims.

What is claimed is:

1. A phase controller for the grid of a gas-type electron-discharge device in series with a lamp energized by an alternating-current source, comprising a voltage divider connected to the source, a grid-controlled vacuum tube and a reactive impedance connected in series and to the terminals of said voltage divider, a coupling circuit between a point intermediate said vacuum tube and said impedance and a tap of said voltage divider for controlling the gas-type device, and a widely adjustable source of controlled voltage for the grid of said vacuum tube.

2. The method of controlling illumination intensity of an alternating-current lamp *in a circuit* having a series thyratron, comprising the steps of supplying *a* voltage variable in magnitude [in relation to] *as a definite function of* the desired intensity, converting the [controlled] *magnitude-variable* voltage to a corresponding two-directionally conductive resistance, [and] deriving therefrom an alternating-current *thyratron-timing* voltage the phase of which is critically related to that of the lamp circuit [for timing the firing of the thyratron appropriately for], *and utilizing said thyratron-timing voltage to vary the conductive intervals of the thyratron as a definite function of* the desired intensity.

3. A controller for the grid of a gas-type electron-discharge device in series with a lamp energized by an alternating-current source, comprising a voltage divider connected to said source, an electrically variable resistance and an impedance connected in series to the terminals of said voltage divider, [and] *said resistance having control electrode means*, an output circuit for controlling said grid and having input connections between a tap in said voltage divider and the point intermediate said impedance and said variable resistance, *and variable voltage-applying means connected to said control electrode means.*

4. A phase-controller for the grid of a gas-type electron-discharge device in series with a lamp energized by an alternating-current source, comprising a voltage divider connected to said source, a back-to-back pair of grid-controlled vacuum tubes, a reactive impedance in a series circuit with said pair of tubes, said series circuit being connected to the terminals of said voltage divider, an output transformer having its primary winding connected to a point between said tubes and said impedance and to a tap of said voltage divider, and an adjustable alternating-current supply for the grids of said vacuum tubes and coupled to the alternating-current source that energizes said voltage divider.

5. A phase-controller according to claim 4, including a dry-disc full wave rectifier between said adjustable alternating-current supply and each of the grids of said vacuum tubes, *said rectifiers being polarized to drive the grids negatively.*

6. An alternating-current circuit including a pair of vacuum tubes each having a cathode, a plate, and a control grid, the cathode of each device being connected to the plate of the other device in back-to-back relation, a widely adjustable alternating-current voltage source, and separate coupling circuits between said source and each of said grids, said circuits including means polarized to drive both grids alike in relation to their cathodes when the related plates are driven positive.

7. In combination, a variable-intensity lamp, a phase-responsive control circuit for said lamp, a series circuit including a reactive impedance and a back-to-back pair of grid-controlled vacuum tubes, *circuit means for providing a voltage reference point,* said series circuit being connected to an alternating-current source at its terminals and at an intermediate point to *a control terminal of* said phase-responsive circuit, *said reference point being connected to another control terminal of said phase-responsive circuit,* and an adjustable control for the grids of said vacuum tubes.

8. In combination, a variable-intensity lamp, a phase-responsive control circuit for said lamp, a series circuit including a reactive impedance and a back-to-back pair of grid-controlled vacuum tubes, *circuit means for providing a voltage reference point,* said series circuit being connected at its terminals to an alternating current source and at a point intermediate said impedance and said vacuum tubes to *a control terminal of said phase-responsive control circuit, said reference point being connected to another control terminal of* said phase-responsive circuit, a rectified alternating-current supply for controlling said vacuum tubes, and a potentiometer for controlling the input to said supply.

9. In combination, a variable-intensity lamp, a phase-responsive control circuit for said lamp, and a variable phase-shift circuit for said control circuit, said phase-shift circuit including a vacuum tube the internal resistance of which is variable as a function of the applied control voltage, and an individual potentiometer and a master potentiometer arranged in cascade to control said vacuum tube, the illumination intensity being variable by said master potentiometer up to the limit fixed by said individual potentiometer.

10. In combination, an array of variable-intensity lamps, a phase-responsive control circuit for each lamp, a phase-shifting network for each control circuit including a vacuum tube the internal resistance of which is variable as a function of the applied control voltage, a control circuit for each of said phase-shifting networks including a preset potentiometer, and a master potentiometer for gradually intensifying the illumination of said array of lamps to limits severally fixed by said preset potentiometers.

11. In combination, a variable-intensity lamp, a phase-responsive control circuit for said lamp, a phase-shifting network for said control network including a vacuum tube the internal resistance of which is variable as a function of the applied control voltage, and an adjustable source of control voltage for said vacuum tube including a master potentiometer having an adjustable tap and a pair of preset potentiometers having their output sections coupled to said vacuum tube and their input terminals coupled to the sections of said master potentiometer on opposite sides of said tap, whereby adjustment of said master potentiometer from one extreme to the opposite adjusts the lamp from a maximum fixed by one of said preset potentiometers to a maximum fixed by the other of said preset potentiometers.

12. In combination, a variable-intensity lamp, a phase-responsive control circuit for said lamp, a phase-shifting network for said control circuit including a vacuum tube the internal resistance of which varies as a function of the applied control voltage, and a variable voltage supply unit including a pair of preset potentiometers having their output sections connected in series and coupled in control relation to said vacuum tube, a master potentiometer having an adjustable tap, and an isolating unit, the portions of said master potentiometer on opposite sides of said tap being connected, respectively, to the input end of said isolating unit and to the terminals of one of said preset potentiometers, the output end of said isolating unit being connected to the terminals of the other of said preset potentiometers.

13. In combination, a variable-intensity lamp, a control unit for said lamp, a pair of preset potentiometers having their output sections connected in a closed loop including the input portion of said control unit, a master potentiometer having an adjustable tap spanned on one portion by one of said preset potentiometers, an isolating unit having its input end spanned by the other portion of said master potentiometer and its output end spanned by the other of said preset potentiometers, said isolating unit being so phased that adjustment of said master potentiometer from one extreme to the opposite extreme will cause variation of the intensity of said lamp from a maximum limit as fixed by one of said preset potentiometers gradually and without reversal to the maximum limit as fixed by the other of said potentiometers.

14. In combination, an array of variable-intensity lamps, a control unit for each of said lamps, a plurality of pairs of preset potentiometers, said pairs having output portions connected in series and to a respective one of said units, and a master potentiometer having complemental sections, one section being coupled to the terminals of one preset potentiometer of each pair and the other section of said master potentiometer being coupled to the terminals of the others of said pairs of preset potentiometers, whereby adjustment of said master potentiometer from one extreme to the opposite extreme will cause said lamps to fade from their bright limits as fixed severally by one preset potentiometer of the pairs proportionally to the several limits fixed by the other preset potentiometers in the respective pairs.

15. In combination, an array of variable-intensity lamps, a control unit for each lamp, a plurality of preset potentiometers for each unit, a pair of selector switches each having multiple ganged sections corresponding to the number of control units and arranged to connect said preset potentiometers to said units in pairs, and a master potentiometer having complemental portions, the preset potentiometers of one of said selector switches being coupled to one of said portions and the preset potentiometers of the other of said selector switches being coupled to the other of said portions, whereby the illumination intensities of the lamps can be changed from the several limits fixed by the selected preset potentiometers of one of said switches to the several limits fixed by the selected preset potentiometers of the other of said switches by operating said master potentiometer from one extreme to the other.

16. An arrangement for applying alternating current from a source to a load comprising a master potentiometer having complemental sections, a transformer having its primary connected across one of said sections, a preset potentiometer connected across the other of said sections, another preset potentiometer connected across the secondary of said transformer, the output portions of the preset potentiometers being connected in series across the load and so phased by the transformer as to be series-aiding when said master potentiometer is in any intermediate position of adjustment, the junction of said preset potentiometers being joined to a fixed terminal of said master potentiometer.

17. The combination of the arrangement of claim 16 with a load spanning said series portions of said preset potentiometers, the impedance of the load being at least ten times that of either preset potentiometer.

18. A phase control network comprising a voltage divider, a series circuit including a pair of vacuum tubes connected back-to-back so that one tube is conductive during each half *of* an alternating-current cycle of applied voltage, said pair of tubes being connected in series with a reactive impedance across said voltage divider, an output circuit connected to a tap in said voltage divider and to a point in said series circuit between said vacuum tubes and said impedance, and a variable control for said vacuum tubes.

19. A phase shifter comprising a voltage divider, a series circuit including a vacuum tube and a reactive impedance connected across said voltage divider, an output circuit connected to a tap in said voltage divider and to a point in said series circuit between said vacuum tube and said impedance, and a variable control circuit for said vacuum tube including a full-wave rectifier and a potentiometer, said variable control and said voltage divider having common supply connections.

20. In combination with a gas-type electron-discharge device having a control grid, an alternating-current control circuit comprising a condenser connected in a series circuit with a pair of grid-controlled vacuum tubes, said tubes being arranged in parallel circuits and oppositely polarized for full-cycle conductivity, a control circuit for said vacuum tubes, *circuit means providing a voltage reference point,* and a coupling circuit [between the grid] *from said reference point and a point in said series circuit between said condenser and tubes, and the grid and cathode* of the gas-type electron-discharge device [and a point in said series circuit between said condenser and said tubes].

21. A lighting control circuit comprising a pair of gas-type tubes connected together in a manner to provide a current path during successive halves of an alternating-current cycle and having control electrodes, a series circuit including a condenser and a back-to-back pair of vacuum tubes having control grids, *circuit means providing a voltage reference point,* a transformer having two secondary windings connected respectively to said control electrodes and having a primary winding connected to said series circuit *and said reference point,* and a variable control circuit connected to said grids.

22. A lighting control circuit comprising a pair of gas-type tubes connected together in a manner to provide a current path during successive halves of an alternating-current cycle and having control electrodes, a series circuit including a reactive impedance and a parallel pair of reversely polarized variable resistance devices each being substantially non-conducting in one direction and having a control element for varying the resistance, *circuit means providing a voltage reference point,* a coupling circuit [between] *for* the control electrodes *and cathodes* of said gas-type tubes, *said circuit running from said reference point* and a point in said series circuit between said reactive impedance and said parallel devices, and an adjustable control circuit connected to said elements.

23. A variable-intensity lighting system comprising a lamp, a back-to-back pair of thyratrons in a series circuit with said lamp, said series circuit having terminals for energization by an alternating-current source, and a network connected in control relation to said thyratrons including a pair of vacuum tubes connected to said terminals for coordinated energization with said thyratrons, each of said vacuum tubes including a grid, a cathode, and a plate, and having variable grid-control means, the plate of one of said tubes being joined directly to the cathode of the other of said tubes in back-to-back relation.

24. A control circuit for a variable-intensity lighting system including a grid-controlled gas-type tube connected in a circuit to alternating-current supply terminals and a phasing circuit connected to the grid of said tube including a condenser and a pair of unidirectionally conductive devices connected to said condenser providing charging and discharging paths, at least one of said devices having a control element adapted to impart a variable-resistance characteristic, and a control circuit connected to said control element.

25. [A] *In a* phase-control network [comprising], a condenser and a pair of vacuum tubes connected in series to alternating-current terminals, each of said tubes having a plate, a cathode, and a control grid, the plate-cathode spaces of said tubes being connected in parallel circuits and the plate of one of said tubes being connected to the cathode of the other, and an adjustable [voltage-] supply for *applying voltage adjustable in magnitude to* said control grids.

26. A controlled lighting circuit having power supply terminals for alternating-current energization, comprising a lamp load and a back-to-back pair of thyratrons joined in series and connected to said terminals, a voltage-responsive phasing circuit coupled through a two-secondary transformer in control relation to said thyratrons, said phasing circuit including a series-connected condenser and back-to-back pair of vacuum tubes, each tube having a control grid, a variable voltage supply including a transformer having a pair of secondary windings connected through rectifiers to said control grids in such polarity as to drive said grids negative, a potentiometer in said variable voltage supply having an adjustable output section connected to said transformer and having fixed terminals, and a variable voltage divider having an adjustable output section connected to said fixed terminals, said variable voltage divider and said phasing circuit having stable connection to said power supply terminals.

27. A controlled lighting array having a variable voltage divider and a plurality of lamp loads, phasing circuits, and variable voltage supplies in accordance with claim 26, the adjustable output section of said variable voltage divider being connected to the terminals of the potentiometers in said variable voltage supplies.

28. A controlled lighting array in accordance with claim 27 wherein said power supply terminals are separated from said lamp loads by a center-tapped autotransformer with certain of said lamp-loads connected on one side of the center-tap and the remainder of the lamp loads connected on the opposite side of the center-tap, said variable voltage divider being connected on one side of the center-tap, and wherein said rectifiers are of the full-wave rectifier type.

29. An alternating-current circuit including a pair of vacuum tubes each having a grid, a cathode, and a plate, the plate-cathode spaces of said tubes being connected in parallel circuits with the cathode of one tube connected to the plate of the other, means to apply alternating-current voltage to said parallel circuits, and means to apply unidirectional voltages of like *adjustable* value to the grid-cathode spaces of said tubes.

30. An alternating-current circuit including a pair of vacuum tubes each having a grid, a cathode and a plate, the plate-cathode spaces of said tubes being arranged in parallel circuits, with the cathode of one tube joined to the plate of the other, means to apply alternating-current voltage to said parallel circuits, separate grid-cathode circuits for said tubes [each including a rectifier polarized] *arranged* to maintain said grids negative with respect to the related cathode *during the conductive half-cycle of the respective tubes*, and a common means to impress alternating-current voltage on said grid-cathode circuits.

31. A variable-resistance alternating-current circuit comprising a back-to-back pair of reversely polarized unidirectionally conductive and variably resistive devices each having a control electrode, means to impress alternating-current voltage on said back-to-back devices, and means to impress like voltages on said control electrodes during the respective half-cycles of impressed voltage when said devices are conductive.

*32. A phase controller for the grid of a gas-type electron-discharge device in series with a lamp energized by an alternating-current source, comprising a voltage divider connected to the source, a back-to-back pair of reversely polarized unidirectionally conductive and variably resistive devices each of which has a control terminal, a reactive impedance, said back-to-back devices and reactive impedance being connected in series across the terminals of the voltage divider, a coupling circuit between a point intermediate said back-to-back devices and said impedance and a tap of said voltage divider for controlling the gas-type device, and a widely adjustable source of voltage for the control terminals of said back-to-back devices.*

*33. In a method of variably energizing an alternating-current lamp in a circuit, that improvement including the steps of supplying a control voltage variable in magnitude in definite relationship to a desired intensity of illumination of the lamp, converting the control voltage to a corresponding two-directionally conductive resistance, with the aid of said resistance producing an alternating-current voltage the phase of which is critically related to that of the lamp circuit, utilizing the critically phased voltage to vary the conductive intervals of a thyratron as a definite direct function of the desired intensity, and using the discharge current of the thyratron to energize the lamp.*

*34. A controller for the grid of a gas-type electron-discharge device in series with a lamp energized by an alternating-current source, comprising a voltage divider connected to said source, an electrically variable resistance and an impedance connected in series across the terminals of said voltage divider, said resistance having high impedance control electrode means, an output circuit for controlling said grid and having input connections between a tap in said voltage divider and the point intermediate said impedance and said variable resistance, and means connected to said control electrode means to apply thereto a controlled voltage variable in amplitude.*

*35. A phase-controller for the grid of a gas-type electron-discharge device in series with a lamp energized by an alternating-current source, comprising a voltage divider connected to said source, a back-to-back pair of grid-controlled vacuum tubes, a reactive impedance in a series circuit with said pair of tubes, said series circuit being connected to the terminals of said voltage divider, an output transformer having its primary winding connected to a point between said tubes and said impedance and to a tap of said voltage divider, and means for supplying alternating-current adjustable in amplitude to the grids of said vacuum tubes, said last-named means including a circuit in phase with the voltage across the voltage divider.*

*36. For use in controlling the intensity of an alternating-current lamp, a phase-responsive control unit for said lamp, a phase-shifting network for said control unit, said network including a vacuum tube the internal resistance of which is variable as a function of the applied voltage, and an adjustable source of control voltage connected to apply grid voltage to said vacuum tube, said source including a master potentiometer having an adjustable tap and a pair of preset potentiometers having their output sections coupled to said vacuum tube and their input terminals coupled to the sections of said master potentiometer on opposite sides of said tap, whereby adjustment of said master potentiometer from one extreme to the opposite adjusts the lamp from a maximum fixed by one of said preset potentiometers to a maximum fixed by the other of said preset potentiometers.*

*37. For use in controlling the intensity of an alternating-current lamp, a phase-responsive unit for said lamp, a phase-shifting network for said control unit, said network including a vacuum tube the internal resistance of which is variable as a function of the applied voltage, and an adjustable source of control voltage connected to apply grid voltage to said vacuum tube, said source including a plurality of presettable voltage control devices, and means gradually to transfer energization from one to another of said devices.*

*38. For use in controlling the intensity of an alternating-current lamp, a phase-responsive control circuit for said lamp, a phase-shifting unit for said control circuit, said unit having a high input impedance, a plurality of presettable low impedance voltage control devices connected in series and to apply voltage to said unit, a first variable voltage means to energize one of said devices, a second variable voltage means to energize another of said devices, said first and second variable voltage means including coordinating means to increase the voltage output of either of said variable voltage means coordinately with decrease of the voltage output of the other of said means.*

*39. In a phase-shifting network, a condenser*

*connected in a series circuit with a pair of grid-controlled vacuum tubes, said tubes being arranged in parallel circuits and oppositely polarized for full-cycle conductivity, and a control circuit for applying voltage of adjustable magnitude to said vacuum tubes.*

*40. A phase-shifting network comprising a voltage divider, a condenser connected in a series circuit with a pair of grid-controlled vacuum tubes across the terminals of the voltage divider, said tubes being arranged in parallel circuits and oppositely polarized for full-cycle conductivity, said tubes having grids, and means to supply an adjustable control voltage to said grids.*

*41. A thyratron control circuit for adjustably energizing an alternating-current lamp, said circuit including in combination a thyratron having grid-and-cathode input terminals and a phase-shift circuit having alternating-current energizing connections and connected in control relationship to said thyratron input terminals, said phase-shift circuit including a condenser and a grid-controlled vacuum tube connected in series, said vacuum tube being conductive during alternate half-cycles of the supplied alternating-current, adjustable control means for said vacuum tube and a unidirectionally conductive device in parallel with said vacuum tube and polarized to be conductive during the half-cycle in which the vacuum tube is non-conductive.*

*42. A phase-control network comprising four legs connected in a loop, said network adapted to have a voltage input applied across a pair of junction points connecting different pairs of legs and to have an output voltage taken from the remaining pair of junctions, one of said legs including a condenser, another of said legs including a pair of grid-control vacuum tubes arranged in parallel circuits and oppositely polarized for full-cycle conductivity and a control circuit for said vacuum tubes.*

*43. For use in a system wherein an alternating-current lamp is energized by the discharge of a thyratron, wherein the thyratron firing is controlled by a phase-shifting network and wherein said network includes an alternating-current device whose impedance is variable as a function of voltage applied to control terminals thereof, means for supplying an adjustable control voltage to said device, said means comprising a pair of presettable control elements connected in series and coupled to the control terminals, and means to selectively energize either one of said elements to adjust the lamp intensity between limits successively determined by said presettable elements.*

*44. For use in a system wherein an alternating-current lamp is energized by the discharge of a thyratron, wherein the thyratron firing is controlled by a phase-shifting network and wherein said network includes an alternating-current device whose impedance is variable as a function of voltage applied to control terminals thereof, said device having a high input impedance, means for supplying an adjustable control voltage to said device, said means comprising a pair of presettable low impedance control elements connected in series and coupled to the control terminals, and means to selectively energize either one of said elements to adjust the lamp intensity between limits successively determined by said presettable elements.*

*45. For use in a system wherein an alternating-current lamp is energized by the discharge of a thyratron, wherein the thyratron firing is controlled by a phase-shifting network and wherein said network includes an alternating-current device whose impedance is variable as a function of voltage applied to control terminals thereof, means for supplying an adjustable control voltage to said device, said means comprising a pair of presettable control elements connected in series and transformer-coupled to the control terminals, and means to selectively energize either one of said elements to adjust the lamp intensity between limits successively determined by said presettable elements.*

*46. For use in a system wherein an alternating-current lamp is energized by the discharge of a thyratron, wherein the thyratron firing is controlled by a phase-shifting network and wherein said network includes a grid-controlled vacuum tube, means for supplying an adjustable voltage to the grid of said vacuum tube, said means comprising a pair of presettable control elements connected in series and coupled to the control terminals to apply a negative voltage to the grid of the tube, and means to selectively energize either one of said elements to adjust the lamp intensity between limits successively determined by said presettable elements.*

*47. For use in a system wherein an alternating-current lamp is energized by the discharge of a thyratron, wherein the thyratron firing is controlled by a phase-shifting network and wherein said network includes an alternating-current device whose impedance is variable as a function of voltage applied to control terminals thereof, means for supplying an adjustable control voltage to said device, said means comprising a plurality of presettable control elements, means to connect a selected pair of said elements in series to said control terminals, and means to selectively energize any one of the elements of said selected pair.*

*48. For use in controlling the intensities of a plurality of lamps, a plurality of control units each controlling a different lamp, a set of presettable potentiometers for each control unit, switch means for selectively connecting a pair of said presettable potentiometers from each set to its associated control unit, and common means for gradually shifting energization from one potentiometer of each of said pairs to the other potentiometer of each of said pairs.*

*49. For use in controlling the intensities of a plurality of lamps, a plurality of control units each controlling a different lamp, a plurality of presettable potentiometers, switch means for selectively connecting a different pair of said presettable potentiometers to each control unit, and common means for gradually shifting energization from one potentiometer of each of said pairs to the other potentiometer of each of said pairs.*

*50. In an alternating current circuit, the method of controlling illumination intensity of a lamp so as to attain any desired lamp intensity over a wide range, including the steps of supplying a control voltage variable in magnitude in definite relationship to a desired intensity of illumination of the lamp, and independent of the lamp current, converting the control voltage to a corresponding two-directionally conductive resistance, with the aid of said resistance producing an alternating-current voltage the phase of which is critically related to that of the lamp circuit, utilizing the critically phased voltage to vary the conductive intervals of a thyratron in a definite direct relationship to the desired lamp*

*intensity, and using the discharge current of the thyratron to energize the lamp.*

*51. A circuit for controlling the illumination intensity of a lamp from an alternating-current source, said circuit including a gas type electron discharge device directly feeding the lamp by series connection, a phase-shifting network for said device, said network including a phase-shift controlling vacuum tube the internal resistance of which is variable as a function of the grid voltage, and an adjustable source of control voltage connected to supply grid voltage to said vacuum tube, said last-named source including a plurality of presettable voltage control devices and means gradually to transfer energization by the alternating current source from one to another of said devices.*

*52. A circuit for controlling the illumination intensity of a lamp from an alternating-current source, said circuit including a gas type electron discharge device directly feeding the lamp by series connection, a phase-shifting network for said device, said network including a high input-impedance variable component for controlling the shift in phase of said network, the regulation of said component being controlled by voltage magnitude, and an adjustable source of control voltage for said component, said source including a plurality of presettable low impedance voltage control devices connected in series and connected to said high input-impedance component, and means gradually to transfer energization by the alternating-current source from one to another of said devices.*

*53. A circuit for controlling illumination intensity of a lamp from an alternating-current source, said circuit including a gas type electron discharge device directly feeding a lamp by series connection, a phase-shifting network controlling the firing of said device, said network including an alternating-current device whose impedance is variable as a function of voltage applied to control terminals thereof, means for supplying an adjustable control voltage to said last-named device, said means comprising a pair of presettable control elements connected in series and coupled to the control terminals, and means to selectively energize either one of said elements to adjust the lamp intensity between limits successively determined by said presettable elements.*

*54. A circuit for controlling illumination intensity of a lamp from an alternating-current source, said circuit including a gas type electron discharge device directly feeding a lamp by series connection, a phase-shifting network controlling the firing of said device, said network including an alternating-current device whose impedance is variable as a function of voltage applied to control terminals thereof, said last-named device having a high input impedance, means for supplying an adjustable control voltage to said last-named device, said means comprising a pair of presettable low impedance control elements connected in series and coupled to the control terminals, and means to selectively energize either one of said elements to adjust the lamp intensity between limits successively determined by said presettable elements.*

*55. A phase controller for the grid of a gas-type electron-discharge device in series with a lamp energized by an alternating-current source, comprising a voltage divider connected to the source in parallel with the series-connected gas-type device and lamp, a grid-controlled vacuum tube and a capacitor connected in series and to the terminals of said voltage divider, a coupling circuit between a point intermediate said vacuum tube and said capacitor and a tap of said voltage divider for controlling the gas-type device, means providing a direct-current discharge path for the capacitor, said means including a portion of the voltage divider and a direct-current-conductive impedance between said portion of the voltage divider and the point intermediate the vacuum tube and the capacitor, and a widely adjustable source of controlled voltage for the grid of said vacuum tube.*

*56. For use in controlling the intensities of a plurality of lamps in series with gas-type electron-discharge devices, a plurality of control units each controlling a different device, a set of presettable potentiometers for each control unit, switch means for selectively connecting a pair of said presettable potentiometers from each set to its associated control unit, and common means for gradually shifting energization from one potentiometer of each of said pairs to the other potentiometer of said pairs.*

*57. For use in controlling the intensities of a plurality of lamps, a plurality of control units each controlling a different lamp, a plurality of presettable potentiometers, switch means for selectively connecting a different pair of said presettable potentiometers to each control unit, and a high impedance circuit coupling the selected presettable potentiometers to the associated lamp.*

*58. For use in controlling the intensities of a plurality of lamps in series with gas-type electron-discharge devices, a plurality of control units each controlling a different device, a plurality of presettable potentiometers, switch means for selectively connecting a different pair of said presettable potentiometers to each control unit, common means for gradually shifting energization from one potentiometer of each of said pairs to the other potentiometer of each of said pairs, and a high impedance circuit coupling the selected presettable potentiometers to the associated electron-discharge device.*

GEORGE C. IZENOUR.

REFERENCES CITED

The following references are of record in the file of this patent or the original patent:

UNITED STATES PATENTS

| Number | Name | Date |
|---|---|---|
| 1,914,193 | Bedford | June 13, 1933 |
| 2,001,836 | Craig | May 21, 1935 |
| 2,001,837 | Craig | May 21, 1935 |
| 2,001,838 | Craig | May 21, 1935 |
| 2,005,893 | Gulliksen | June 25, 1935 |
| 2,054,496 | Craig | Sept. 12, 1936 |
| 2,076,108 | Young | Apr. 6, 1937 |
| 2,231,955 | Shrader | Feb. 18, 1941 |
| 2,242,105 | Brettell | May 13, 1941 |
| 2,376,392 | Shepherd | May 22, 1945 |
| 2,411,030 | Ryder | Nov. 12, 1946 |
| 2,458,644 | Ringer | Jan. 11, 1949 |
| 2,474,886 | Bovey | July 5, 1949 |

FOREIGN PATENTS

| Number | Country | Date |
|---|---|---|
| 747,996 | France | Apr. 10, 1933 |

OTHER REFERENCES

Analysis and Characteristics of Vacuum Tube Thyratron Phase-Control Circuit, by Samuel C. Coroniti, Proceedings of I. R. E., vol. 31, No. 12, December 1943. (Copy in Div. 10.)